(12) United States Patent
Incavo et al.

(10) Patent No.: US 8,597,449 B2
(45) Date of Patent: Dec. 3, 2013

(54) METHOD FOR RECOVERING UNCURED RUBBER AND TIRE INCLUDING RECLAIMED RUBBER

(75) Inventors: Joseph Alan Incavo, Hudson, OH (US); Kathleen Marie Deren, Copley, OH (US); Warren James Busch, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 310 days.

(21) Appl. No.: 12/954,124

(22) Filed: Nov. 24, 2010

(65) Prior Publication Data

US 2012/0125505 A1    May 24, 2012

(51) Int. Cl.
*B29D 30/00* (2006.01)
*B32B 38/10* (2006.01)

(52) U.S. Cl.
USPC .......... 156/110.1; 156/94; 156/250; 264/326; 264/501; 264/911

(58) Field of Classification Search
USPC .......... 156/94, 95, 344, 250, 110.1; 264/326, 264/501, 911
See application file for complete search history.

(56) References Cited

U.S. PATENT DOCUMENTS

| | | | |
|---|---|---|---|
| 4,000,552 A | 1/1977 | Pleis | |
| 4,097,566 A | 6/1978 | Bertin et al. | |
| 4,342,647 A * | 8/1982 | McMillan et al. | 241/19 |
| 4,399,854 A * | 8/1983 | DiRocco et al. | 152/367 |
| 4,613,087 A | 9/1986 | Snyder | |
| 4,656,910 A | 4/1987 | Peterson | |
| 5,264,640 A | 11/1993 | Platz | |
| 5,695,131 A | 12/1997 | Wenzel | |
| 6,199,468 B1 | 3/2001 | Hackbarth et al. | |
| 7,549,453 B2 | 6/2009 | Ikeda | |
| 8,114,335 B2 * | 2/2012 | Conger et al. | 264/501 |
| 8,157,194 B2 * | 4/2012 | Theusner | 241/24.17 |
| 2008/0142137 A1* | 6/2008 | Scheungraber | 152/370 |

FOREIGN PATENT DOCUMENTS

| | | | |
|---|---|---|---|
| DE | 2934381 | * | 3/1980 |
| DE | 10154825 | * | 5/2003 |
| JP | 53-92882 | * | 8/1978 |
| WO | WO 2006/121140 | * | 11/2006 |
| ZA | 9907120 | * | 7/2000 |

* cited by examiner

*Primary Examiner* — Justin Fischer
(74) *Attorney, Agent, or Firm* — Wood, Herron & Evans LLP

(57) ABSTRACT

A method for recovering uncured rubber from unused electron beam pre-cured rubber stock used in the manufacture of pneumatic tires. A first layer of the pre-cured rubber stock having cured rubber is skived with a band knife cutter blade from a second layer of the pre-cured rubber stock having uncured rubber. The band knife cutter blade is lubricated so as to avoid adhesion of the uncured rubber to a leading cutting edge of the cutter blade. After the first layer of cured rubber is removed from the pre-cured rubber stock, the uncured rubber in the second layer is reworked into at least one tire component.

20 Claims, 3 Drawing Sheets

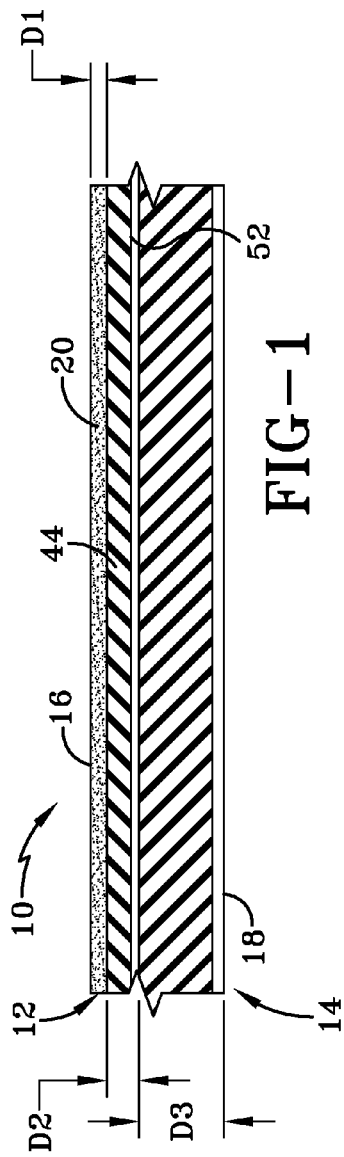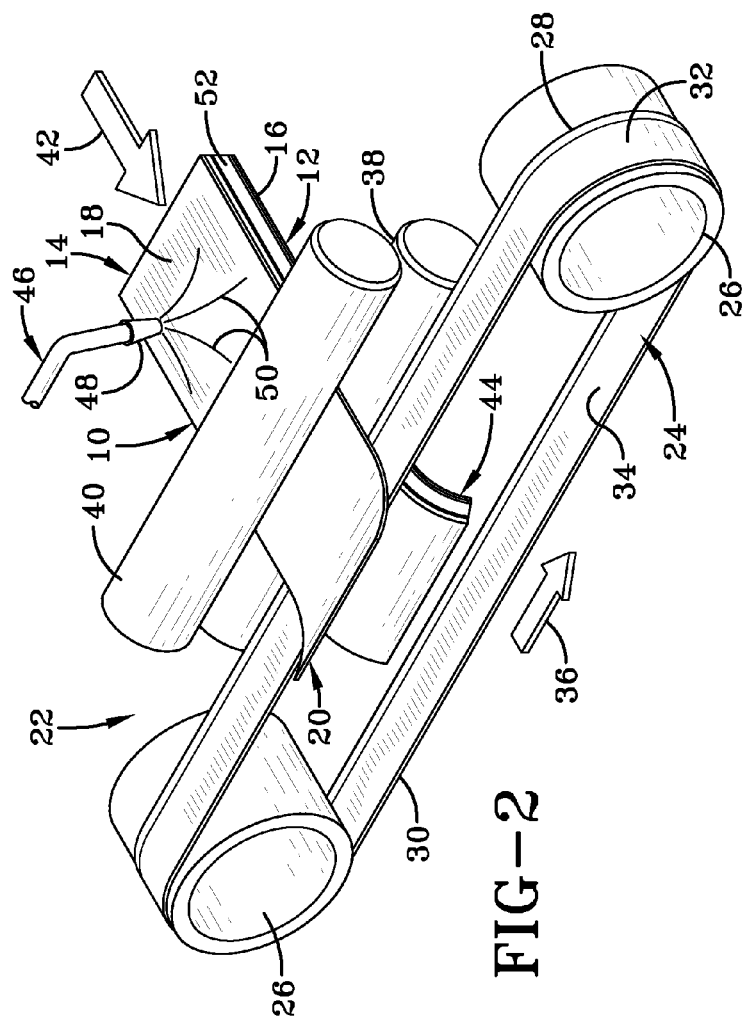

METHOD FOR RECOVERING UNCURED RUBBER AND TIRE INCLUDING RECLAIMED RUBBER

TECHNICAL FIELD

This invention generally relates to pneumatic tires used on passenger vehicles and associated methods, and more particularly to methods for recovering uncured rubber from unused rubber stock produced in the manufacture of pneumatic tires.

BACKGROUND

Pneumatic tires for passenger vehicles are conventionally manufactured using a wide variety of types of rubber, including natural rubber. In this regard, natural rubber may be incorporated into various tire components including the carcass and plies, the inner liner, the barrier layer, the sidewalls, the tire crown, and the tread. During the manufacturing process, some tire components including green (i.e., uncured) rubber may be pre-cured by irradiating the outermost layer of rubber with an electron beam, which strengthens the components by cross-linking the polymer chains of rubber molecules in the outermost layer. For example, pre-curing the barrier layer that separates the inner liner from the plies of the carcass provides additional green strength in the area where the barrier layer contacts the plies when the tire is assembled. Consequently, as the tire is cured a more consistent gage of the barrier layer measured between the plies and the inner liner is possible. In another example, pre-curing the rubber material surrounding a calendared ply stabilizes the plies as they are wound into the tire carcass. As a result, less overall rubber material (e.g., up to 20% less rubber) is required to manufacture a pneumatic tire. In this way, electron-beam pre-curing of the surface affords significant advantages by improving the quality and weight of the tire.

Although the pre-curing process allows a tire to be manufactured with less rubber material, there is always some pre-cured rubber stock that is not used at the beginning or the end of an extrusion or calendaring process. While unused rubber stock is typically recycled into other tires, pre-cured rubber stock presents significant problems when reworking the pre-cured rubber stock back into compounds for forming tire components. The pre-cured or cross-linked domains in such compounds tend to produce an area of high stress concentration in a cured tire. Additionally, this stock contains curatives and accelerators so that any reprocessing imparts work to the stock which can lead to domains of pre-vulcanized lumps in the stock. This renders the stock unusable in tire manufacturing.

The problems with reworking pre-cured rubber stock are exacerbated in certain applications such as radial medium truck tire construction, in which the pre-cured rubber stock includes a laminate including a layer of natural rubber (with a partially cured surface layer) and a layer of butyl rubber. In these applications, the cross-linked domains in the natural rubber are again difficult to rework, and furthermore, the butyl rubber is incompatible with other types of rubber. Consequently, it is difficult to produce tire components from non-butyl rubber compounds when reworked pre-cured rubber stock is included in the non-butyl rubber compounds. As a result, the pre-cured rubber stock is largely disposed by selling the pre-cured rubber stock to a third-party vendor in non-tire applications rather than being recycled by reworking the rubber material back into a component for manufacturing tires.

In other applications, unused rubber stock may include a thin protective film adhesively applied to one side of the rubber stock. This film is not rubber material and cannot be reworked into rubber compounds, but the film is typically difficult to remove from the unused rubber stock. Unused rubber stock may also be contaminated along one side with various contaminants. In these circumstances, the entire unused rubber stock is typically disposed by selling to a third party rather than recycling the unused rubber stock into rubber compounds used in producing tire components.

There is a need, therefore, for an improved method for recovering uncured or uncontaminated rubber from unused rubber stock that addresses these and other issues associated with manufacturing tires with recycled components.

SUMMARY

In one embodiment of the invention, a method for recovering uncured rubber from unused electron beam pre-cured rubber stock includes skiving a first layer of the pre-cured rubber stock from a second layer of the pre-cured rubber stock. The first layer includes cured rubber and the second layer includes uncured rubber. The method also includes reclaiming the uncured rubber in the second layer by reworking the uncured rubber into at least one tire component. For example, the uncured rubber may be reworked into a liner compound used in an inner liner of a pneumatic tire. Alternatively, the uncured rubber may be reworked into a tread compound used in a tread of a pneumatic tire. In another example, the uncured rubber may be reworked into a carcass compound used in a carcass of a pneumatic tire. Also, the uncured rubber may be reworked into a barrier layer compound used in a barrier layer of a pneumatic tire. Recycling rubber material in this manner has a positive impact on the environment because less rubber material ends up unused in the tire manufacturing process.

Skiving the first layer of the pre-cured rubber stock from the second layer may further include circulating a band knife cutter blade having a leading cutting edge in a first direction. The pre-cured rubber stock is moved toward the band knife cutter blade in a second direction transverse to the first direction. To that end, the pre-cured rubber stock is positioned between a pair of rollers adjacent to the leading cutting edge of the band knife cutter blade, the rollers configured to locate the leading cutting edge at a predetermined depth below a top surface of the pre-cured rubber stock. The band knife cutter blade may also be lubricated to avoid adhesion of uncured rubber material to the leading cutting edge of the band knife cutter blade.

In another embodiment, a pneumatic tire includes a carcass, an inner liner, a barrier layer between the carcass and the inner liner, and a tread. At least one component of the pneumatic tire includes reclaimed uncured rubber material skived from unused electron beam pre-cured rubber stock. The at least one component may be the tread, the barrier layer, or the inner liner.

BRIEF DESCRIPTION OF THE DRAWINGS

FIG. 1 is a side elevation view of pre-cured rubber stock used in one embodiment of the method according to the invention.

FIG. 2 is a perspective view of the pre-cured rubber stock of FIG. 1 being skived by a band knife cutter according to the method.

DEFINITIONS

Figure 3:
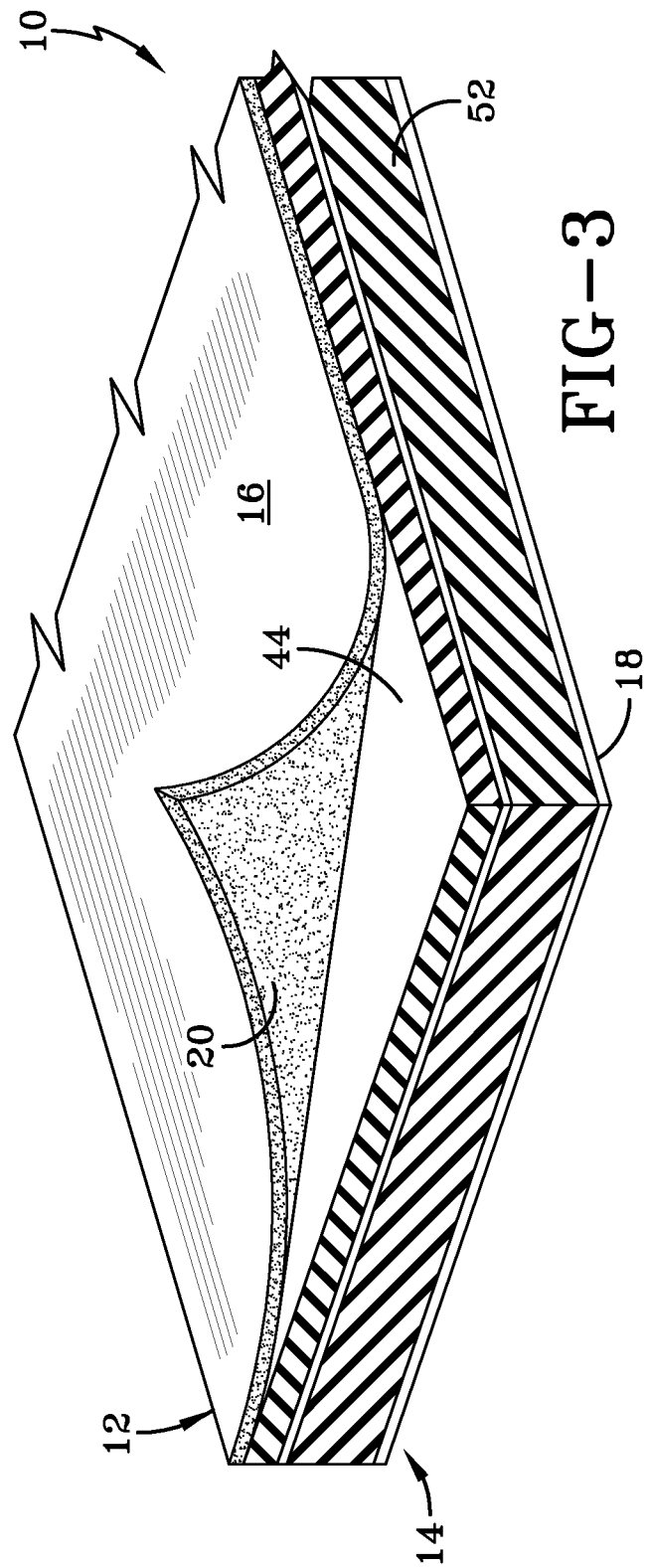
FIG. 3 is a front perspective view of the pre-cured rubber stock of FIG. 1 after the skiving illustrated in FIG. 2.

"Air Chamber" means an annular pneumatic chamber defined between a tire and the rim when the tire is installed on the rim.

"Barrier Layer" means the layer of rubber material positioned between the inner liner and the carcass of a pneumatic tire, and more specifically, a radial medium truck tire.

"Bead" means a circumferentially substantially inextensible metal wire assembly that forms the core of the bead area, and is associated with holding the tire to the rim.

"Butyl Rubber" means a synthetic elastomeric hydrocarbon polymer including a copolymer of isobutylene with isoprene and any derivatives of this copolymer such as bromobutyl rubber and chlorobutyl rubber.

"Carcass" means the tire structure apart from the belt structure, tread, undertread, and sidewall rubber over the plies, but including the beads.

"Compound" means a rubber material or a mixture of rubber materials used in the manufacture of tire components.

"Electron Beam" means an ionizing type of radiation that is capable of inducing profound changes in organic matter, including but not limited to cross-linking of molecules.

"Green" means material, typically rubber, which has not undergone a curing or pre-curing process.

"Inner" means toward the inside of the tire.

"Inner Liner" means a molded rubber layer covering the inner side of the carcass and facing the air chamber when the tire is assembled.

"Natural Rubber" means an elastic hydrocarbon polymer derived from latex, including the purified form referred to as polyisoprene.

"Outer" means toward the exterior of the tire.

"Ply" or "Plies" means a calendared fabric thread coated with rubber and wound between the beads to form the conventional carcass of a tire.

"Pneumatic Tire" means a laminated mechanical device of generally toroidal shape, usually an open torus, having beads and a tread and made of rubber, chemicals, fabric, and steel or other materials. When mounted on the wheel of a motor vehicle, the tire through its tread provides traction and contains the fluid that sustains the vehicle load.

"Pre-Cured" or "Pre-Curing" means irradiating a piece of rubber stock with an electron beam to induce cross-linking of rubber molecules along a top layer of the rubber stock, thereby strengthening that top layer.

"Sidewall" means that portion of a tire between the tread and the bead area.

"Skive" or "Skiving" means cutting through a piece of rubber stock, such as a sheet, so as to split the rubber stock into two generally parallel layers.

"Tread" means a molded rubber component which includes the portion of the tire that comes into contact with the road when the tire is normally inflated and under normal load.

DETAILED DESCRIPTION

With reference to FIGS. 1-4, one embodiment of a method for recovering uncured natural rubber from unused pre-cured rubber stock is illustrated. One embodiment of electron beam pre-cured rubber stock 10 is illustrated in FIG. 1. In the exemplary embodiment, the pre-cured rubber stock 10 includes a top layer 12 composed of natural rubber and a bottom layer 14 composed of butyl rubber. The top layer 12 and the bottom layer 14 are joined as a laminate to produce the rubber stock 10. However, other types of rubber or laminates of multiple types of rubber such as polybutadiene and styrene-butadiene rubber (SBR) may be used in other embodiments of the invention. The top layer 12 includes a top surface 16 and the bottom layer 14 includes a bottom surface 18. The rubber stock 10 may be typically used in the formation of a co-calendared or co-extruded component of a pneumatic tire, in one example.

Prior to application of the rubber stock 10 as a multi-layer component for the carcass and beads of a pneumatic tire, the rubber stock 10 is pre-cured by irradiating the top layer 12 with an electron beam to cross-link rubber molecules and generate a first layer 20 of cured natural rubber material adjacent to the top surface 16. The first layer 20 generally has a depth "D1" that is less than the thickness of the top layer 12 of natural rubber. Consequently, the pre-cured rubber stock 10 has an increased green strength compared to a completely green or uncured laminate of natural rubber and butyl rubber. Furthermore, the pre-cured rubber stock 10 includes successive layers of cured natural rubber, uncured natural rubber, and butyl rubber. The cured natural rubber in the pre-cured rubber stock 10 is configured to engage or abut the carcass and provide a consistent gage of barrier between the plies in the carcass and an inner liner overlying the bottom surface 18 of the pre-cured rubber stock 10 when a pneumatic tire is assembled. More or fewer types of rubber may be formed as a laminate and then partially pre-cured within the scope of this invention.

FIG. 2 schematically illustrates a band knife cutter system 22 configured to skive the pre-cured rubber stock 10. The cutter system 22 includes a band knife cutter blade 24 mounted on a pair of drive rollers 26. The band knife cutter blade 24 is a generally continuous loop of flexible elongate metal defining a leading cutting edge 28, a trailing edge 30, an outer surface 32, and an inner surface 34. The drive rollers 26 engage the inner surface 34 of the cutter blade 24 and rotate the cutter blade 24 in a first direction indicated by arrow 36. The leading cutting edge 28 is sharpened to penetrate through a generally flat layer of material as the cutter blade 24 moves in the first direction. One of the drive rollers 26 may actively drive the movement of the cutter blade 24 while the other drive roller 26 acts as an idler wheel in some embodiments. Although not illustrated in FIG. 2, substantially all of the band knife cutter blade 24 and the pair of drive rollers 26 will be disposed within a machine housing to contain cutting debris and prevent inadvertent contamination or contact with these components of the band knife cutter system 22.

The cutter system 22 also includes a first feed roller 38 and a second feed roller 40 located generally adjacent to the leading cutting edge 28 of the cutter blade 24. The second feed roller 40 is generally disposed directly above the first feed roller 38 as shown in FIG. 2. The first and second feed rollers 38, 40 are configured to accurately locate a laminate of pre-cured rubber stock 10 with respect to the leading cutting edge 28 of the cutter blade 24. In this regard, the second feed roller 40 may be rigidly mounted on the cutter system 22 while the first feed roller 38 is partially spring-biased toward the second feed roller 40 such that laminates or slightly varying thickness may be skived by the cutter system 22. Alternatively, the second feed roller 40 may be spring-biased alone or in combination with the first feed roller 38, in other embodiments. The pre-cured rubber stock 10 is then moved toward the cutter blade 24 and between the first and second feed rollers 38, 40 in a second direction indicated by arrow 42 and transverse to the first direction. The pre-cured rubber stock 10 may be moved manually, or the first and second feed rollers 38, 40 may be driven by a motor (not shown) to propel the pre-cured rubber stock 10 toward the cutter blade 24.

In the illustrated embodiment, the feed rollers 38, 40 locate the cutter blade 24 at a predetermined depth below the top surface 16 generally equivalent to the depth D1 of the first layer 20 having cured natural rubber material. For example, the predetermined depth D1 may be in the range of 0.8 millimeters to 1.0 millimeter, which generally corresponds to a typical depth of cured material in pre-cured rubber stock 10. Therefore, as the cutter blade 24 is circulated by the drive rollers 26 in the first direction and the pre-cured rubber stock 10 moves in the second direction, the leading cutting edge 28 penetrates the natural rubber top layer 12 to split the first layer 20 of cured material from a second layer 44 of uncured material including uncured natural rubber and butyl rubber. The splitting of the first layer 20 of the pre-cured rubber stock 10 from the second layer 44 of the pre-cured rubber stock 10 is otherwise known as skiving.

Uncured rubber is generally a sticky and soft material, which increases the difficulty encountered in skiving the first layer 20 from the second layer 44. To this end, uncured rubber may build up on the cutter blade 24 until the leading cutting edge 28 is ineffective at penetrating the pre-cured rubber stock 10, or the cutter blade 24 jams against one of the drive rollers 26. To overcome these difficulties, the cutter system 22 may include a lubrication system 46 partially shown in FIG. 2. The lubrication system 46 includes a sprayer nozzle 48 that lubricates the cutter blade 24 by spraying the outer surface 32, the inner surface 34, and the leading cutting edge 28 with a lubricating fluid 50 generally analogous to windshield-wiper fluid. In one example, the lubricating fluid 50 includes water, a detergent, and methanol or another appropriate alcohol such as ethanol or isopropanol. This lubricating fluid 50 is effective at avoiding or preventing adhesion between the cutter blade 24 and the uncured rubber material. Although the lubrication system 46 is illustrated adjacent to the point of skiving and the feed rollers 38, 40, the lubrication system could be positioned anywhere upstream of the point of skiving within the scope of this invention.

The cutter system 22 may further include a suction channel (not shown). In these embodiments, the suction channel and the first and second feed rollers 38, 40 may be coated with an adhesion-resistant coating such as Teflon® to thereby prevent sticking of uncured rubber to various components of the cutter system 22. Consequently, the pre-cured rubber stock 10 may be split or skived by the cutter system 22 at room temperatures without jamming the cutter blade 24 or rendering the cutter blade 24 ineffective.

FIG. 3 illustrates the pre-cured rubber stock 10 after the cutter system 22 has skived the first layer 20 of cured rubber material from the second layer 44 of uncured rubber material. The first layer 20 of cured rubber material may be peeled away from the second layer 44 as shown in FIG. 3. The first layer 20 of cured rubber material is not easily reworkable and is therefore collected for disposal such as by selling the first layer 20 to a third-party vendor for use in non-tire settings (including but not limited to rubber paving tiles, floor mats, and rubber-based mulch products). The second layer 44 of uncured rubber material is then reclaimed or recycled by reworking the uncured rubber material into at least one tire component. In the exemplary embodiment of FIGS. 1 and 3, the second layer 44 of uncured rubber material is generally much thicker than the depth D1 of the first layer 20 of cured rubber material in pre-cured rubber stock 10. More specifically, the uncured natural rubber in the second layer 44 defines a second depth D2 and the butyl rubber in the second layer 44 defines a third depth D3, where the combination of the second depth D2 and the third depth D3 is much greater than the depth D1 of the first layer 20 skived from the pre-cured rubber stock 10. Furthermore, the third depth D3 is typically larger than the second depth D2 on the order of two or three times larger, such that the second layer 44 is substantially composed of butyl rubber material and may be successfully reworked into a butyl-based rubber compound used in various tire components. Thus, the process of skiving the first layer 20 and reclaiming the second layer 44 reuses a substantial percentage of the unused rubber material in the pre-cured rubber stock 10. In turn, the effective material savings produced by pre-curing the rubber stock 10 during tire manufacturing is improved significantly. In this regard, less rubber material ends up in a landfill, which has a positive impact on the environment.

Figure 4:
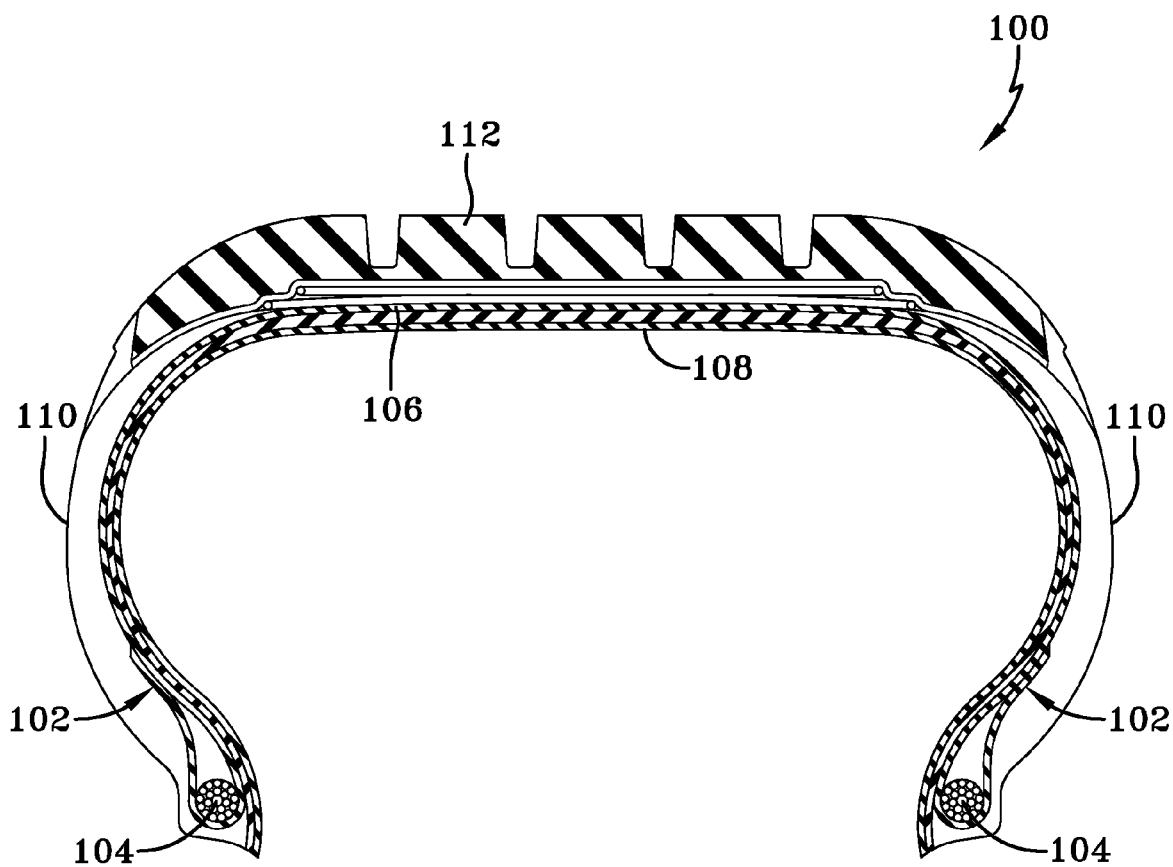
FIG. 4 is a front cross-sectional view of a pneumatic tire formed with rubber material reclaimed from the pre-cured rubber stock of FIG. 1.

As well-understood in the tire manufacturing art and shown in FIG. 4, a pneumatic tire 100 typically includes a plurality of components including a carcass 102 formed by a plurality of calendared plies wrapped about two beads 104, a barrier layer 106 disposed on the interior side of the carcass 102, an inner liner 108 covering the barrier layer 106 on an interior side and facing toward an air chamber, sidewalls 110 covering the carcass 102 and facing away from the air chamber, and a tire crown including a tread 112 configured to engage a road surface. Any one of these components or combinations of tire components may be formed using compounds that include reclaimed uncured rubber from the second layer 44 of the pre-cured rubber stock 10. For example, the uncured rubber of the second layer 44 may be reworked into a liner compound, and the liner compound may then be used to extrude an inner liner 108 for a pneumatic tire 100. Also, the uncured rubber of the second layer 44 may be reworked into a barrier layer compound, and the barrier layer compound may then be used to extrude a barrier layer 106 for a pneumatic tire 100. In another example, the uncured rubber of the second layer 44 may be reworked into a tread compound, and the tread compound may then be used to extrude a tread 112 for a pneumatic tire 100. In yet another example, the uncured rubber of the second layer 44 may be reworked into a carcass compound, and the carcass compound may be used to surround a plurality of plies to form the carcass 102 of a pneumatic tire 100. Therefore, the uncured natural rubber from unused pre-cured rubber stock 10 may be successfully recovered and used in the manufacture of other pneumatic tires 100.

As previously discussed, reworking laminates of uncured natural rubber and butyl rubber may be difficult because the combination of the natural rubber and the butyl rubber is incompatible for use in non butyl-based rubber compounds. In the embodiment of the pre-cured rubber stock 10 in FIGS. 1-3, the second layer 44 of uncured rubber material may include both natural rubber and butyl rubber. Consequently, the second layer 44 of the pre-cured rubber stock 10 may be skived again by the band knife cutter system 22 to divide the second layer 44 at the interface 52 between the top layer 12 consisting of natural rubber and the bottom layer 14 consisting of butyl rubber. The top layer 12 of uncured natural rubber may then be reworked into compounds including natural rubber or other types of rubber, while the bottom layer 14 of butyl rubber may be reworked with other butyl rubber-based compounds. In another example, the complete second layer 44 of the pre-cured rubber stock 44 including both natural rubber and butyl rubber may be reworked into pneumatic tires configured for off-the-road operation and having at least one component including butyl rubber and natural rubber.

Alternatively, the pre-cured rubber stock 10 may be replaced with any rubber stock having a non-reworkable top layer and a reworkable bottom layer. For example, rubber stock used in the manufacture of tires may include a film adhesively applied to a top surface, or rubber stock may be contaminated along a top layer. In both of these circumstances, the band knife cutter system 22 may be used to skive the top layer that is not reworkable from the bottom layer that is reworkable to enable the recycling of as much useable rubber material as possible. In another alternative scenario, the band knife cutter system 22 may be used to skive rubber stock containing calendared plies such that the non-reworkable plies can be removed from reworkable rubber material. Therefore, the methods of the invention are not limited to treatment and reclaiming rubber material in pre-cured rubber stock 10.

In summary, the cutter system 22 enables the recovery of uncured rubber from unused electron beam pre-cured rubber stock 10. The first layer 20 of generally cured rubber material is skived from the second layer 44 of generally uncured rubber material. In this regard, a leading cutting edge 28 of the cutter blade 24 is circulated in a first direction and the pre-cured rubber stock 10 is positioned between first and second feed rollers 38, 40 and moved in a second direction transverse to the first direction in order to have the leading cutting edge 28 penetrate through uncured rubber material of the pre-cured rubber stock 10. The first layer 20 of cured rubber material may be sold for use in non-tire products, and the second layer 44 of uncured rubber material is reclaimed by reworking the uncured rubber material into at least one tire compound. Furthermore, in embodiments where the second layer 44 of uncured rubber includes different types of rubber, the second layer 44 may undergo additional skiving to separate the layers of different rubber types or may alternatively be reworked into a pneumatic tire configured for off-the-road operation. Therefore, the majority of unused pre-cured rubber stock 10 during the manufacture of pneumatic tires is effectively reclaimed and used in later manufacture of pneumatic tires.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A method for recovering uncured rubber from unused electron beam pre-cured rubber stock, the method comprising:
    skiving a first layer of the pre-cured rubber stock from a second layer of the pre-cured rubber stock, the first layer including cured rubber and the second layer including uncured rubber; and
    reclaiming the uncured rubber of the second layer of the pre-cured rubber stock by reworking the uncured rubber into at least one tire component.

2. The method of claim 1, wherein the uncured rubber is reclaimed into a liner compound, and the at least one tire component is an inner liner for a tire that includes the liner compound.

3. The method of claim 1, wherein the uncured rubber is reclaimed into a barrier layer compound, and the at least one tire component is a barrier layer for a tire that includes the barrier layer compound.

4. The method of claim 1, wherein the uncured rubber is reclaimed into a tread compound, and the at least one tire component is a tread for a tire that includes the tread compound.

5. The method of claim 1, wherein the uncured rubber is reclaimed into a carcass compound, and the at least one tire component is a carcass for a tire that includes the carcass compound.

6. The method of claim 1, wherein skiving the first layer of the pre-cured rubber stock from the second layer of the pre-cured rubber stock further comprises:
    circulating a band knife cutter blade having a leading cutting edge in a first direction; and
    moving the pre-cured rubber stock toward the band knife cutter blade in a second direction transverse to the first direction.

7. The method of claim 6, wherein skiving the first layer of the pre-cured rubber stock from the second layer of the pre-cured rubber stock further comprises:
    positioning the pre-cured rubber stock between a pair of rollers disposed adjacent to the leading cutting edge of the band knife cutter blade, the pair of rollers configured to locate the pre-cured rubber stock so that the leading cutting edge engages the pre-cured rubber stock at a predetermined depth below a top surface of the pre-cured rubber stock.

8. The method of claim 7, wherein the predetermined depth corresponds to approximately a depth of cured rubber formed in the electron beam pre-curing of the pre-cured rubber stock.

9. The method of claim 8, wherein the predetermined depth is in a range of 0.8 millimeters to 1.0 millimeter.

10. The method of claim 6, wherein skiving the first layer of the pre-cured rubber stock from the second layer of the pre-cured rubber stock further comprises:
    lubricating the band knife cutter blade to avoid adhesion of uncured rubber material to the leading cutting edge as the pre-cured rubber stock is skived.

11. The method of claim 10, wherein the band knife cutter blade is lubricated with a fluid comprised of water, detergent, and methanol.

12. The method of claim 1, wherein the first layer of the pre-cured rubber stock is skived from the second layer of the pre-cured rubber stock at room temperature.

13. The method of claim 1, wherein the second layer of the pre-cured rubber stock includes a laminate of uncured natural rubber and butyl rubber.

14. The method of claim 13, wherein the second layer of the pre-cured rubber stock includes substantially more butyl rubber than natural rubber such that the second layer may be reclaimed into a butyl rubber-based tire compound.

15. The method of claim 13, further comprising:
    removing the natural rubber from the butyl rubber of the second layer with another skiving operation before reclaiming the natural rubber of the second layer.

16. A method for recovering rubber from unused rubber stock including a first layer of cured rubber material and a second layer of uncured rubber material, the method comprising:
    skiving the first layer of the unused rubber stock from the second layer of the unused rubber stock at an interface between the first and second layers; and reclaiming uncured rubber of the second layer of the unused rubber stock by reworking the uncured rubber into at least one tire component.

17. The method of claim 16, wherein skiving the first layer of the unused rubber stock from the second layer of the unused rubber stock further comprises:
   circulating a band knife cutter blade having a leading cutting edge in a first direction; and
   moving the unused rubber stock toward the band knife cutter blade in a second direction transverse to the first direction.

18. The method of claim 17, wherein skiving the first layer of the unused rubber stock from the second layer of the unused rubber stock further comprises:
   positioning the unused rubber stock between a pair of rollers disposed adjacent to the leading cutting edge of the band knife cutter blade, the pair of rollers configured to locate the unused rubber stock so that the leading cutting edge engages the unused rubber stock at a predetermined depth corresponding to the interface between the first and second layers.

19. The method of claim 17, wherein skiving the first layer of the unused rubber stock from the second layer of the unused rubber stock further comprises:
   lubricating the band knife cutter blade to avoid adhesion of uncured rubber material to the leading cutting edge as the unused rubber stock is skived.

20. The method of claim 16, wherein the first layer of the unused rubber stock is skived from the second layer of the unused rubber stock at room temperature.

\* \* \* \* \*